A. WARTH.

Improvement in Taps for Oil Packages.

No. 4,403. Reissued May 30, 1871.

Witnesses.

C. Wahlers

Ernst Bilhuber

Inventor.

Albin Warth per

Van Santvoord & Hauff

Attys

ANL PHOTO-LITHOGRAPHIC CO. N. Y. (OSBORNE'S PROCESS.)

UNITED STATES PATENT OFFICE.

ALBIN WARTH, OF STAPLETON, NEW YORK.

IMPROVEMENT IN TAPS FOR OIL-PACKAGES.

Specification forming part of Letters Patent No. 110,612, dated December 27, 1870; reissue No. 4,403, dated May 30, 1871.

DIVISION A.

*To all whom it may concern:*

Be it known that I, ALBIN WARTH, of Stapleton, in the county of Richmond and State of New York, have invented a new and useful Improvement in Taps for Oil-Packages; and I do hereby declare the following to be a full, clear, and exact description thereof, which will enable those skilled in the art to make and use the same, reference being had to the accompanying drawing forming part of this specification, in which drawing—

Figure 1:
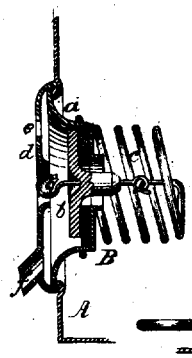
Figure 2:
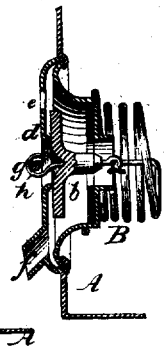
Figure 3:
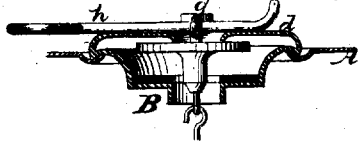

Figure 1 represents a central section of this invention when the tap is closed. Fig. 2 is a similar section of the same when the tap is open. Fig. 3 is a similar section of the same, showing the key which I use for keeping the valve open.

Similar letters indicate corresponding parts.

This invention relates to a certain improvement on that class of taps for which a patent was granted to me July 5, 1870, No. 105,150, and in which a valve is used, which is forced up against its seat by an internal spring in such manner that the valve is protected against injury, and at the same time the discharge of the liquid can be effected without difficulty. From the center of the valve projects a loop for the reception of a key in such a manner that, by forcing the key through said loop and across the protecting-plate, the valve is held open, and the liquid contained in the package to which my tap is attached is free to discharge without requiring any further attention.

In the drawing, the letter A designates a package or can, to which my tap B is attached. This tap consists of a cup-shaped disk, *a*, the outer surface of which forms a seat for the valve *b*, which is drawn up against its seat by by a spring, *c*, secured to the inner surface of the disk *a*, and hitched onto a hook projecting from the stem of the valve. The valve *b* is protected by a plate, *d*, which is raised sufficiently above the disk *a* to permit the valve to be opened, and which is provided with a vent-hole, *e*, and a discharge-opening, *f*. Through a hole in the center of the protecting-plate projects a loop, *g*, and if a wire or key, *h*, is forced through this loop, as shown in Fig. 3, the valve is kept open, and the liquid contained in the can is free to discharge. The rim of the central hole in the protecting-plate is depressed, so that when the valve is raised from its seat it bears against this rim and prevents the liquid from leaking through said central hole.

What I claim as new, and desire to secure by Letters Patent, is—

The protecting-plate *d* formed with the vent *e*, spout *f*, and central depressed opening, in combination with the valve *b* provided with the loops *g* and *k*, the former operated upon by a bar, *h*, the latter connected with the end of the spring, the whole constructed and operating substantially as described.

ALBIN WARTH.

Witnesses:
W. HAUFF,
E. BILHUBER.